United States Patent
Ichikawa et al.

(10) Patent No.: US 10,346,099 B2
(45) Date of Patent: Jul. 9, 2019

(54) NON-TRANSITORY COMPUTER READABLE RECORDING MEDIUM ON WHICH A UI PROGRAM IS RECORDED, PRINT CONTROL APPARATUS AND CONTROL METHOD OF THE SAME WHEREIN SETTING ITEMS ARE ASSIGNED TO GROUPS

(71) Applicant: Konica Minolta Inc., Chiyoda-ku, Tokyo (JP)

(72) Inventors: Chie Ichikawa, Tokyo (JP); Yoshiyuki Harada, Musashino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/813,676

(22) Filed: Jul. 30, 2015

(65) Prior Publication Data
US 2016/0085484 A1  Mar. 24, 2016

(30) Foreign Application Priority Data
Sep. 19, 2014   (JP) ................. 2014-191019

(51) Int. Cl.
*G06F 3/12* (2006.01)

(52) U.S. Cl.
CPC .......... *G06F 3/1205* (2013.01); *G06F 3/1225* (2013.01); *G06F 3/1253* (2013.01); *G06F 3/1258* (2013.01); *G06F 3/1276* (2013.01)

(58) Field of Classification Search
CPC .... G06F 3/1205; G06F 3/1258; G06F 3/1276; G06F 3/1297; G06F 3/1225

(Continued)

(56) References Cited

U.S. PATENT DOCUMENTS 7,853,946 B2 * 12/2010 Minagawa ............ G06F 3/1203
　　　　　　　　　　　　　　　　　　　　　717/173
8,848,217 B2 *  9/2014 Kobayashi ............ G06F 3/1203
　　　　　　　　　　　　　　　　　　　　　358/1.13
(Continued)

FOREIGN PATENT DOCUMENTS

| JP | 2010-170200 A | 8/2010 |
|----|---------------|--------|
| JP | 2013-186835 A | 9/2013 |
| JP | 2014-134848 A | 7/2014 |

OTHER PUBLICATIONS

An Office Action (Rejection Notice) dated Apr. 26, 2016 by the Japanese Patent Office in corresponding Japanese Patent Application No. 2014-191019, and an English Translation of the Office Action. (6 pages).

(Continued)

*Primary Examiner* — Benny Q Tieu
*Assistant Examiner* — Juan M Guillermety
(74) *Attorney, Agent, or Firm* — Buchanan Ingersoll & Rooney PC

(57) ABSTRACT

A UI program is recorded on a non-transitory computer readable medium for operating a computer as a print control apparatus in cooperation with a driver core module. The UI program causes the computer to execute: a first display control step of running a display program and displaying first setting items ECα (EC1 to EC5 and EC41), and a second display control step of running a default program and displaying a second setting item ECβ (EC42) which cannot be displayed by the display program. In the second display control step, the second setting item ECβ (EC42) is displayed in a position adjacent to one of the first setting items ECα (EC41) having the same group information as the second setting item ECβ (EC42).

8 Claims, 8 Drawing Sheets

(58) Field of Classification Search
USPC .......................................................... 358/1.13
See application file for complete search history.

(56) References Cited

U.S. PATENT DOCUMENTS

| | | | | |
|---|---|---|---|---|
| 9,037,760 | B2* | 5/2015 | Nishihara | G06F 13/385 710/48 |
| 9,047,032 | B2* | 6/2015 | Mitsui | G06F 3/1205 |
| 9,141,784 | B2* | 9/2015 | Ono | G06F 21/608 |
| 9,298,411 | B2* | 3/2016 | Kobayashi | G06F 3/1297 |
| 2007/0177179 | A1* | 8/2007 | Takatsu | G06F 3/1205 358/1.13 |
| 2008/0209449 | A1* | 8/2008 | Maehira | G06F 9/44505 719/321 |
| 2009/0063710 | A1* | 3/2009 | Sekine | G06F 3/1285 710/1 |
| 2010/0115464 | A1* | 5/2010 | Harada | G06F 3/1205 715/810 |
| 2010/0188688 | A1* | 7/2010 | Selvaraj | G06F 3/1225 358/1.15 |
| 2010/0199209 | A1 | 8/2010 | Sueoka et al. | |
| 2011/0026072 | A1* | 2/2011 | Xiao | G06F 3/1205 358/1.15 |
| 2012/0194844 | A1* | 8/2012 | Natori | G06F 3/1205 358/1.15 |
| 2013/0060836 | A1* | 3/2013 | Bowers | H04L 41/0286 709/203 |
| 2013/0094044 | A1* | 4/2013 | Harada | G06F 3/1205 358/1.13 |
| 2013/0235402 | A1 | 9/2013 | Yamamichi | |

OTHER PUBLICATIONS

First Office Action issued in corresponding Chinese Patent Application No. 201510589387.3, dated Jan. 3, 2018, with English Translation (14 pages).

* cited by examiner

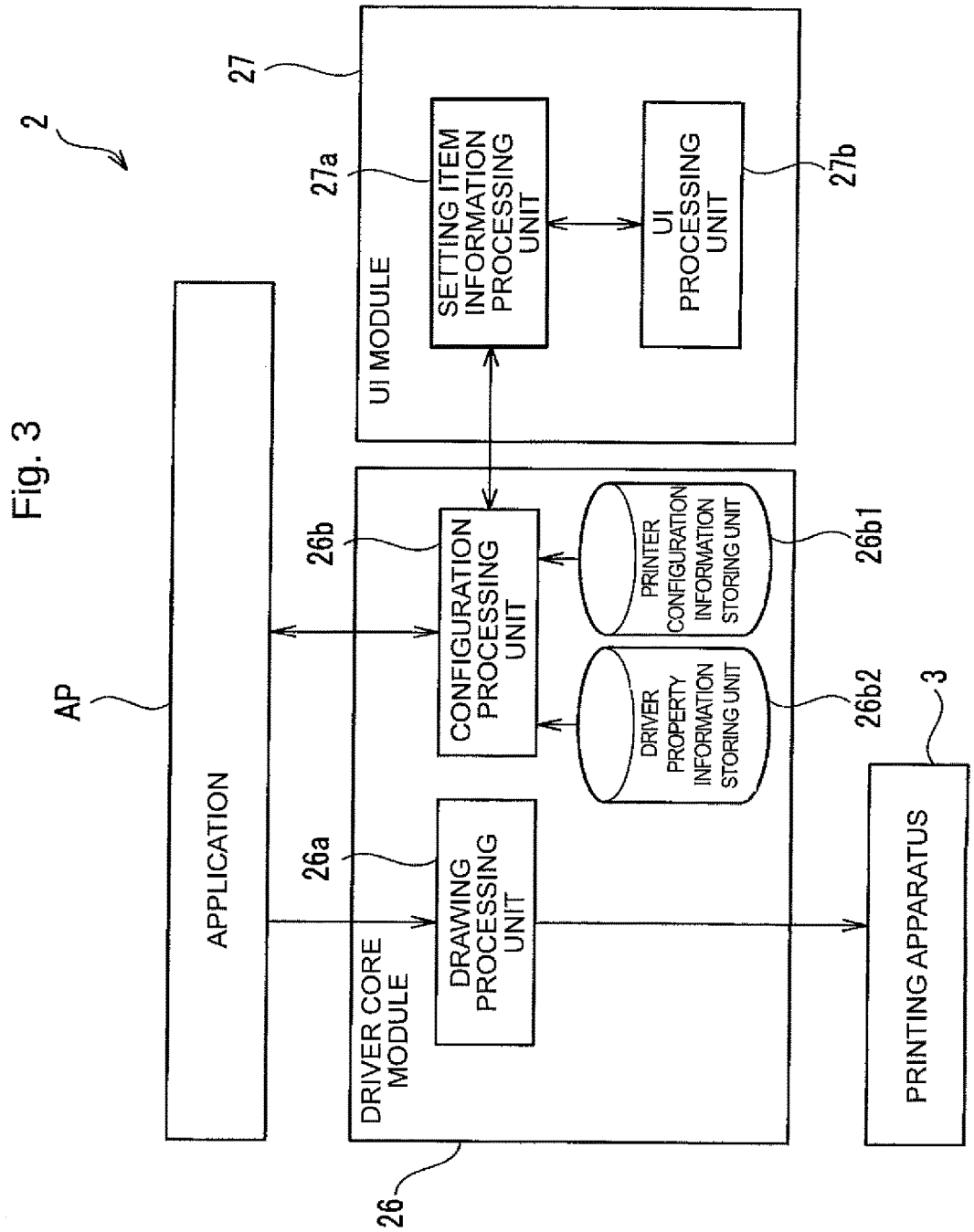

Fig. 7

| SETTING ITEM | GROUP INFORMATION |
|---|---|
| Orientation of Original | Basic Settings |
| Size of Original | Basic Settings |
| Number of Copies | Basic Settings |
| Page Allocation | Basic Settings |
| Allocation Layout | Page Allocation |
| Frame Line | Page Allocation |
| Type of Sheet | Basic Settings |
| . . . | . . . |
| Overlay | Stamp / Page Printing |
| Watermark | Stamp / Page Printing |
| Watermark Text | Watermark |
| Font Name | Watermark |
| Border | Watermark |
| Color | Watermark |
| . . . | . . . |

NON-TRANSITORY COMPUTER READABLE RECORDING MEDIUM ON WHICH A UI PROGRAM IS RECORDED, PRINT CONTROL APPARATUS AND CONTROL METHOD OF THE SAME WHEREIN SETTING ITEMS ARE ASSIGNED TO GROUPS

CROSS-REFERENCE TO RELATED APPLICATIONS

The present application claims priority under 35 U.S.C. § 119 to Japanese Patent Application No. P2014-191019, filed Sep. 19, 2014. The contents of this application are herein incorporated by reference in their entirety.

BACKGROUND OF THE INVENTION

Field of Invention

The present invention relates to a non-transitory computer readable recording medium on which a UI program is recorded, a print control apparatus and a control method of the same.

Description of Related Art

Conventionally, printer drivers are used to control printing apparatuses. The printer driver is a program which is installed in a PC (Personal Computer) or the like. Various setting items for printing (orientation of originals, size of the original, the number of copies to be printed and so forth) are displayed on the display unit of the PC in which the program is installed. A user can perform desired printing after inputting appropriate values to the setting items which are displayed (for example, refer to Japanese Patent Published Application No. 2014-134848).

Some type of such printer drivers consists of a driver core module and a UI (User Interface) module which are installed respectively as separate packages and updated separately (for example, v4 printer driver model). Because of this, in the case where the UI module is not updated while the driver core module has been updated to introduce an additional setting parameter, the additional setting parameter may not appropriately be displayed. The usability is substantially degraded in such a case.

For example, it is assumed that only the driver core module is updated in a printer driver having, as one of page allocation functions, an allocation layout function which can be used for printing images of a plurality of pages in a single sheet, such as 2in1, 4in1 or the like. Also, it is assumed that the driver core module is updated to have a frame border function with which each page can be surrounded with a frame border, as one of page allocation functions, when printing images of a plurality of pages in a single sheet. In such a case, since the UI module has not been updated yet, it cannot be determined where the setting item of the frame border function has to be displayed so that the setting item of the frame border function may be displayed in a position apart the setting item of the allocation layout function, and thereby the usability is substantially degraded because these functions are separated although both belong to the same functional category relating to page allocation.

SUMMARY OF THE INVENTION

To achieve at least one of the above-mentioned objects, reflecting one aspect of the present invention, in a non-transitory computer readable medium on which is recorded a UI program for operating a computer as a print control apparatus in cooperation with a driver core module, the UI program receives information about a plurality of setting items for setting printing conditions from the driver core module and displays a user interface of the plurality of setting items to a user, wherein the driver core module is configured to perform a drawing process based on set values input to the plurality of setting items and output a print job including the result of the drawing process to a printing apparatus. The UI program causes the computer to execute: a first display control step of running a display program and displaying, of the plurality of setting items received from the driver core module, first setting items which can be displayed by the display program; an acquiring step of acquiring group information which is assigned to each of the plurality of setting items and indicative of a group to which the each setting item belongs; and a second display control step of running a default program and displaying, of the plurality of setting items received from the driver core module, a second setting item which cannot be displayed by the display program. In the second display control step, the second setting item is displayed in a position adjacent to one of the first setting items having the same group information as the second setting item.

Also, to achieve at least one of the above-mentioned objects, reflecting one aspect of the present invention, in a print control apparatus having a driver core module and a UI module, the UI module receives information about a plurality of setting items for setting printing conditions from the driver core module and displays a user interface of the plurality of setting items to a user, and the driver core module is configured to perform a drawing process based on set values input to the plurality of setting items and output a print job including the result of the drawing process to a printing apparatus. The print control apparatus comprises: a first display control unit structured to run a display program and display, of the plurality of setting items received from the driver core module, first setting items which can be displayed by the display program; an acquiring unit structured to acquire group information which is assigned to each of the plurality of setting items and indicative of a group to which the each setting item belongs; and a second display control unit structured to run a default program having been stored in advance and display, of the plurality of setting items received from the driver core module, a second setting item which cannot be displayed by the display program. The second display control unit displays in a position adjacent to one of the first setting items having the same group information as the second setting item.

Furthermore, to achieve at least one of the above-mentioned objects, reflecting one aspect of the present invention, in a control method of controlling a print control apparatus implemented with a driver core module and a UI module, the UI module receives information about a plurality of setting items for setting printing conditions from the driver core module and displays a user interface of the plurality of setting items to a user, and the driver core module is configured to perform a drawing process based on set values input to the plurality of setting items and output a print job including the result of the drawing process to a printing apparatus. The control method comprises: a first display control step of running a display program and displaying, of the plurality of setting items received from the driver core module, first setting items which can be displayed by the display program; an acquiring step of acquiring group information which is assigned to each of the plurality of setting items and indicative of a group to which the each setting item belongs; and a second display control step of running a default program having been stored in advance and displaying, of the plurality of setting items received from the driver core module, a second setting item which cannot be displayed by the display program. In the second display control step, the second setting item is displayed in a position adjacent to one of the first setting items having the same group information as the second setting item.

BRIEF DESCRIPTION OF THE DRAWINGS

FIG. 3 is a view for schematically showing the software configuration (functional architecture) of the PC shown in FIG. 1.

FIG. 7 shows an example of group information.

DETAILED DESCRIPTION OF THE PREFERRED EMBODIMENT

Hereinafter, a description is given of embodiments of the present invention with reference to the drawings.

Figure 1:
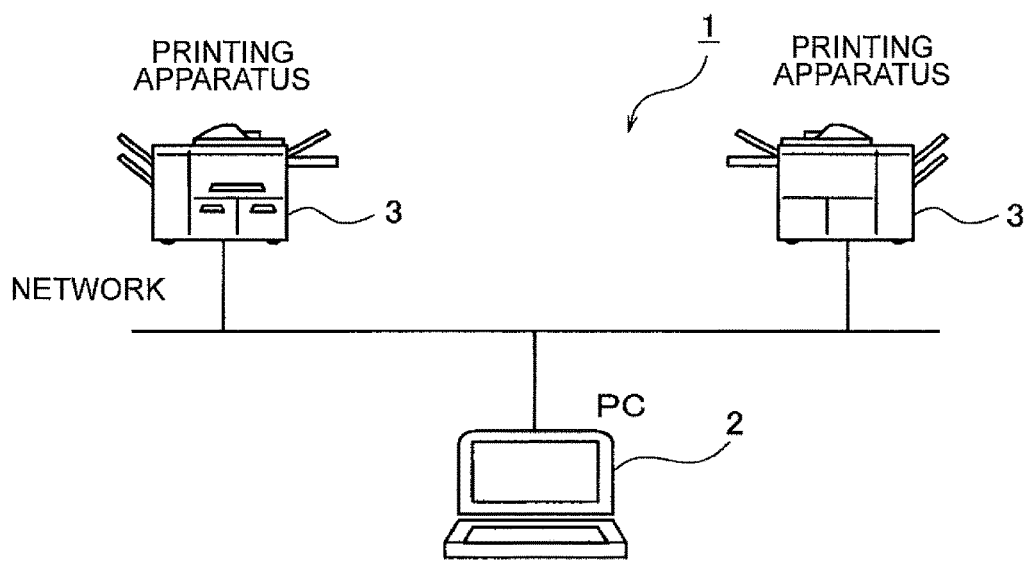
FIG. 1 is a view for schematically showing the configuration of a print system including a print control apparatus in accordance with an embodiment of the present invention.

FIG. 1 is a view for schematically showing the configuration of a print system including a print control apparatus in accordance with the present embodiment. As shown in FIG. 1, the print system 1 consists, for example, of a single or a plurality of PC (Personal Computer serving as a print control apparatus) 2, a single or a plurality of printing apparatuses 3, and a network through which these elements are connected. Incidentally, while FIG. 1 illustrates only one PC 2 and two printing apparatuses 3, an arbitrary number of PC 2 and an arbitrary number of printing apparatuses 3 can be connected to the print system 1.

The PC 2 is a usual personal computer which is controlled by an OS (Operating System). The printing apparatus 3 receives a print job output from the PC 2 through the network, and performs a print process in accordance with the print job. Incidentally, the printing apparatus 3 may or may not have a copy function.

Figure 2:
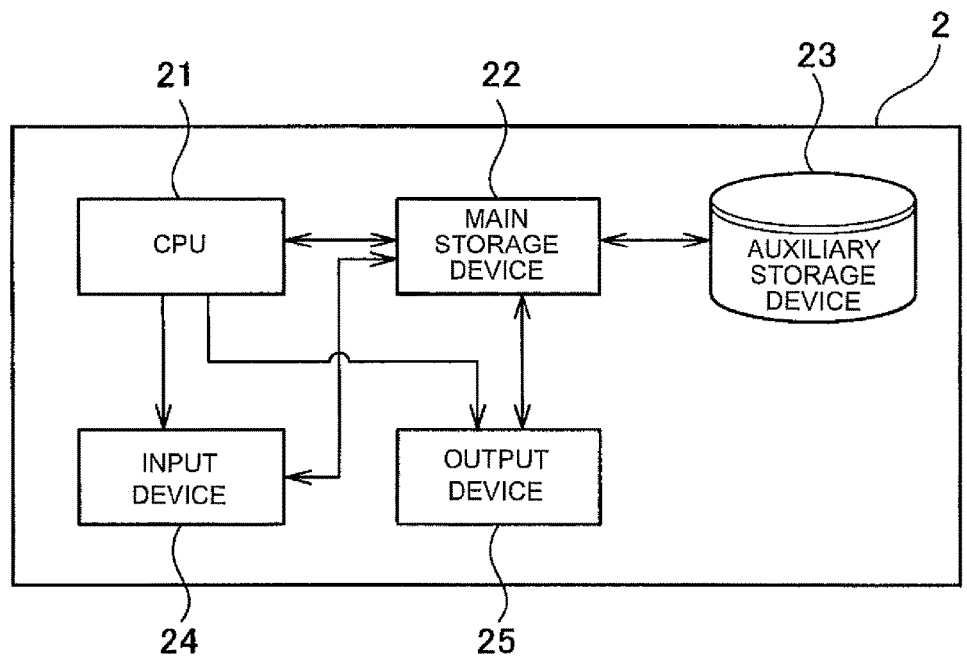
FIG. 2 is a view for schematically showing the hardware configuration of a PC shown in FIG. 1.

FIG. 2 is a view for schematically showing the hardware configuration of the PC 2 shown in FIG. 1. As shown in FIG. 2, the PC 2 is provided with a CPU (Central Processing Unit) 21, a main storage device 22, an auxiliary storage device 23, an input device 24 and an output device 25.

The CPU 21 generally controls the PC 2 and serves as a central processing unit which performs various arithmetic operations. The main storage device 22 is a memory which temporarily stores information which is needed when the CPU 21 performs a process. The auxiliary storage device 23 is a storage device which plays an auxiliary role for the main storage device 22. The auxiliary storage device 23 stores programs such as a UI program for use in the print control apparatus of the present embodiment.

The input device 24 is a device such as a keyboard, a mouse and/or the like for externally inputting commands and information. The output device 25 is a device, such as a display, a printer and/or the like for outputting information outwards based on processing results by the CPU 21. Particularly, a display is a typical user interface through which the CPU 21 displays processing results to a user.

FIG. 3 is a view for schematically showing the software configuration (functional architecture) of the PC 2 shown in FIG. 1. The PC 2 is provided with, as function units in accordance with the present embodiment, a driver core module 26 implemented as a driver core program which is stored in the auxiliary storage device 23 and loaded and run by the CPU 21, and a UI unit (UI module) 27 implemented as a UI program which is stored in the auxiliary storage device 23 and loaded and run by the CPU 21. Incidentally, in this description, these driver core program and UI program are generally referred to as a printer driver program.

The driver core module 26 is provided with a drawing processing unit 26a and a configuration processing unit 26b. The present embodiment is meant to be implemented with a v4 driver which includes the driver core module 26 as a core of the v4 driver.

The drawing processing unit 26a performs drawing processing based on information transmitted from an application AP such as Word or Excel (registered trademark). More specifically, the drawing processing unit 26a performs drawing processing based on parameters input to the setting items regarding to drawing among a plurality of setting items (for example, orientation of originals, size of the originals, the number of copies to be printed, page layout and so forth) for setting required printing conditions. On the other hand, the driver core module 26 outputs a print job including the result of the drawing processing performed by the drawing processing unit 26a to the printing apparatus 3.

The configuration processing unit 26b serves to save driver configuration information and provided with a printer configuration information storing unit 26b1 and a driver property information storing unit 26b2. The driver configuration information includes printer configuration information (GPD/PPD) and driver property information (Driver PropertyBag). The printer configuration information storing unit 26b1 and the driver property information storing unit 26b2 store the printer configuration information and the driver property information respectively.

The printer configuration information is digital information in the form of a GPD file and a PPD file representing the functions of the printing apparatus 3 connected to the network. The information relating to the plurality of setting items are generated with reference to the printer configuration information and exchanged between the applications AP and the UI unit 27. The generated information relating to the plurality of setting items consists of print capacity information and print ticket information. The print capacity information includes available setting items (i.e., the plurality of setting items) and other definition information of setting values (for example, "A4", "A3", "B4" . . . if the setting item is the size of sheets). The print ticket information includes current value information about what set values have been designated for the setting items (for example, if the setting item is the size of sheets, the information indicates that "A4" has been designated).

The driver property information is driver-specific read-only data which is written in an XML format and can be accessed from the UI unit 27. Furthermore, the driver property information storing unit 26b2 stores group information, control information and location information provided in accordance with the present embodiment and described below.

The UI unit 27 is a module for realizing an advanced user interface, which is a vender original interface and realized by running the UI program with the CPU 21 as described above. The UI unit 27 of the present embodiment can be implemented, for example, as two types of apps, i.e., a windows 8 store device app for displaying a print setting screen for a windows 8 modern UI and a printer extension app for displaying a print setting screen for a desktop UI.

This kind of the UI unit 27 is provided with the setting item information processing unit (acquisition unit) 27a, and a UI processing unit (a first display control unit and a second display control unit) 27b. The setting item information processing unit 27a receives and processes the information relating to the plurality of setting items, and transmits the processed information to the UI processing unit 27b, and also updates the print ticket information in accordance with the parameters set by a user and transfers the updated print ticket information to the driver core module 26.

The UI processing unit 27b generates and displays the print setting screen with reference to the information relating to the plurality of setting items received from the setting item information processing unit 27a, screen definition and control information (a display program and a default program) available within the UI processing unit 27b, and resource data. Incidentally, the screen definition and control information can be implemented by a printer extension app which is described in C#/XAML, or implemented by a windows 8 store device app which is described in C#/XAML, Javascript/HTML or C++/XAML. Next, an example of the print setting screen will be explained.

Figure 4A:
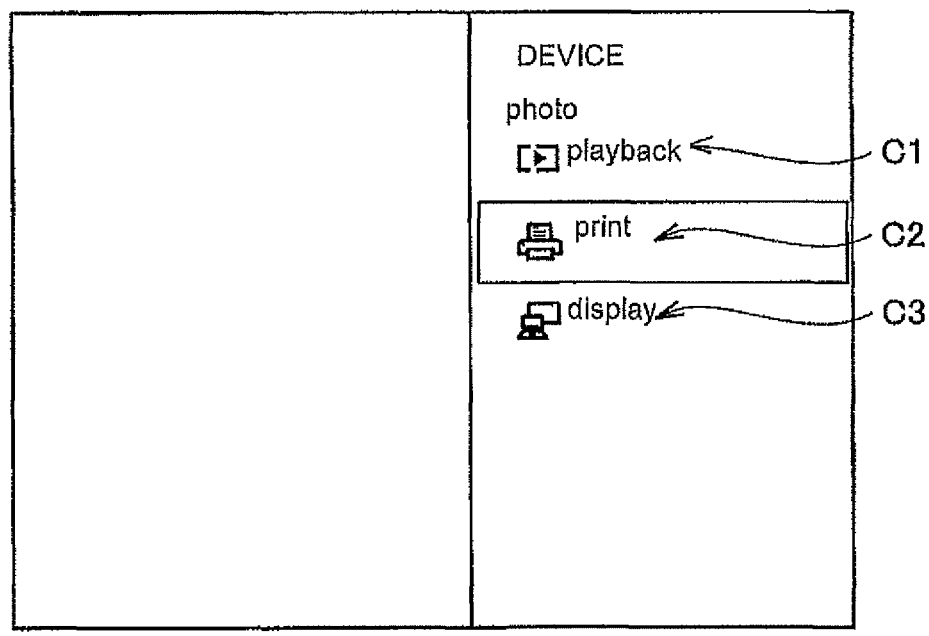
FIG. 4A is a first views for explaining a print setting screen for modern UI.
Figure 4B:
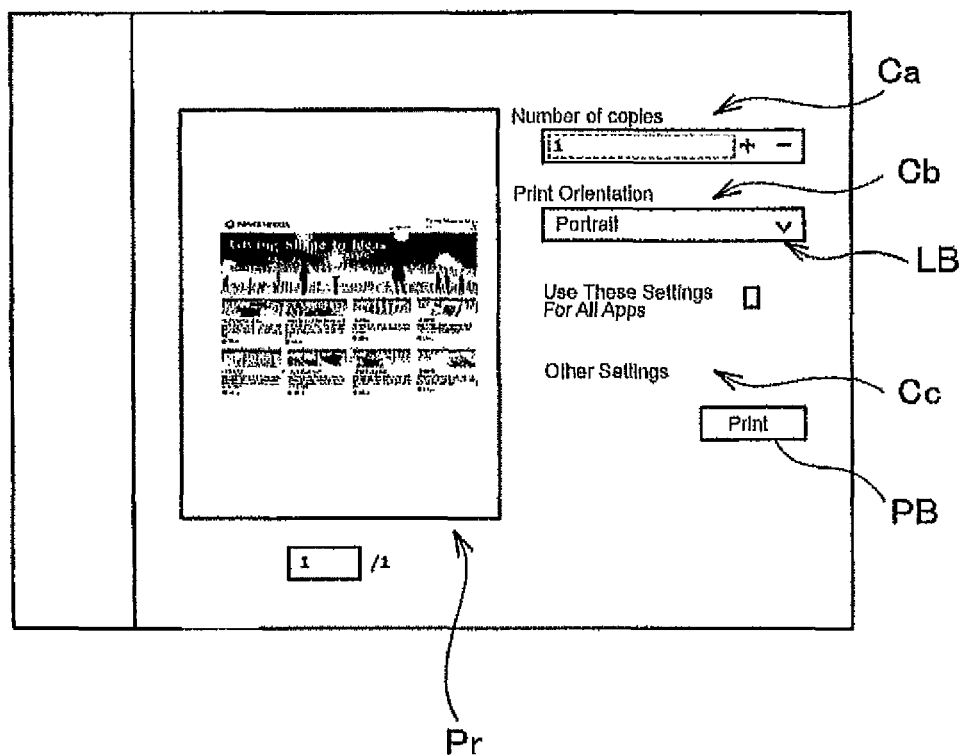
FIG. 4B is a second views for explaining a print setting screen for modern UI.

FIGS. 4A and 4B are views for explaining a print setting screen for modern UI. Also, FIG. 5 is a view for showing the print setting screen for modern UI.

The modern UI is an interface screen in which switches are arranged in a tiling manner for designating mail, calendar, web browser and the like. Each tile is colored and displayed, for example, with a pastel color. When a mouse cursor is moved to the rightmost edge of the desktop in such a modern UI, for example as shown in FIG. 4A, an action screen appears from the rightmost edge of the desktop with a playback charm C1, a print charm C2 and a display charm C3. A user can display a screen shown in FIG. 4B by designating the print charm C2 of the action screen.

The screen shown in FIG. 4B includes a "Number of Copies" item Ca and a "Print Orientation" item Cb. Also, an "Other Settings" item Cc is displayed. When the "Other Settings" item Cc is designated by the user, a print setting screen for modern UI is displayed. Incidentally, this screen also includes a preview window Pr and a print button PB.

Figure 5:
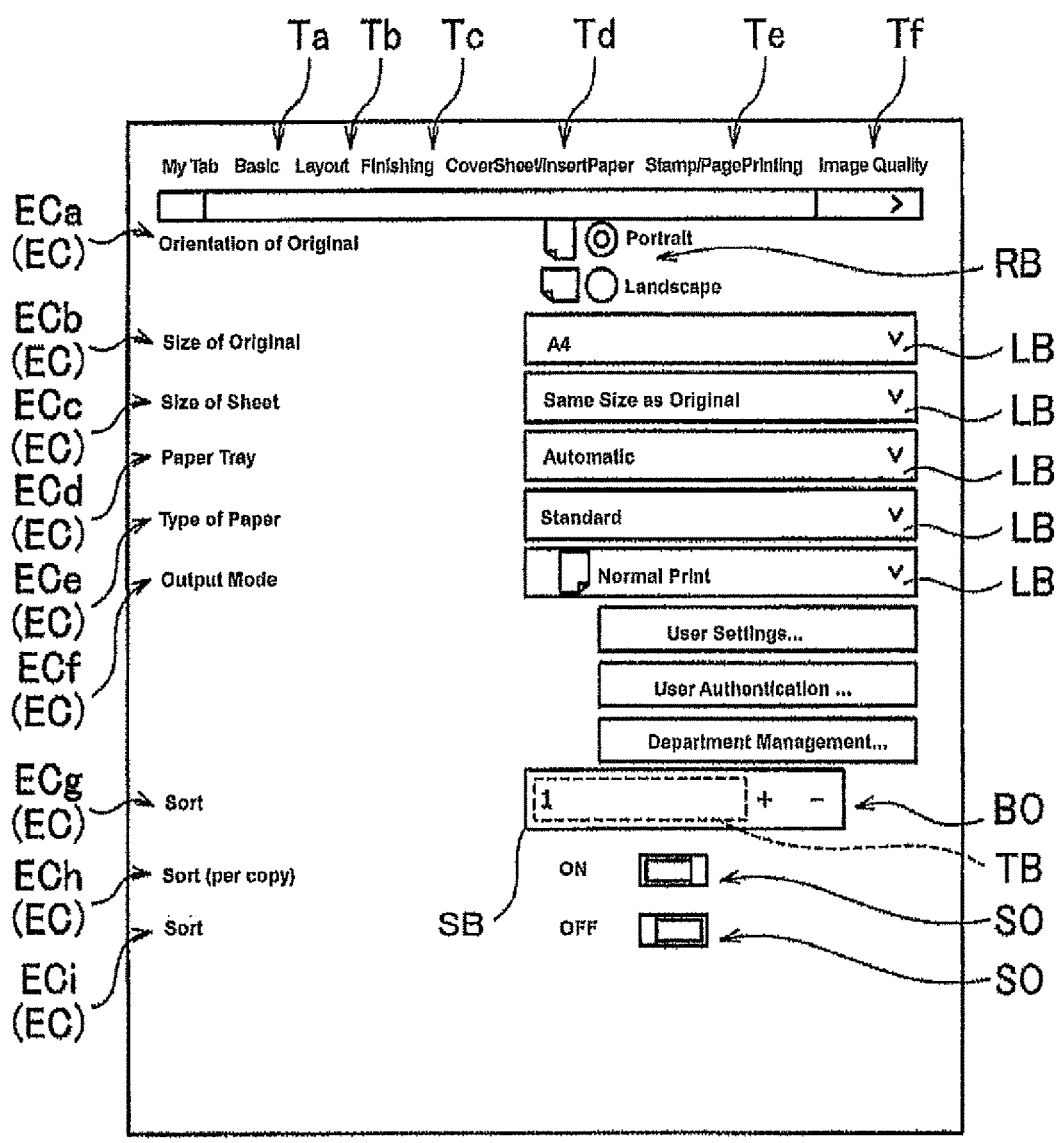
FIG. 5 is a view for showing a print setting screen for modern UI.

As illustrated in FIG. 5, the print setting screen for modern UI includes, for example, six tabs Ta to Tf, i.e., a "basic" tab Ta, a "layout" tab Tb, a "finishing" tab Tc, a "cover sheet/insertion sheet" tab Td, a "stamp/page printing" tab Te, and a "image quality" tab Tf. The screen which is displayed when the "basic" tab Ta is designated includes a plurality of setting items EC, i.e., an "Orientation of Original" item ECa, a "Size of Original" item ECb, a "Size of Sheet" item ECc, a "Paper Feed Tray" item ECd, a "Type of Paper" item ECe, an "Output Mode" item ECf, a "Number of Copies" item ECg, a "Sort (per copy)" item ECh, and a "Sort" item ECi, which are displayed from the top of the screen in this order.

Arbitrary set values can be entered to the setting items ECa to ECi respectively. For example, the "Number of Copies" item ECg can be set to a set value between 1 to 9999. Specifically, the "Number of Copies" item ECg can be set to a set value through a spin box SB consisting of a text box TB for inputting the number of copies and operation buttons BO for incrementing and decrementing the number of copies. A user can directly input an arbitrary number of copies to the text box TB. Furthermore, the user can adjust the number of copies by pressing the operation button BO on the right side of the text box TB.

The "Orientation of Original" items ECa can be set to either set value of "Portrait" and "Landscape". These setting items can be set by radio buttons RB arranged with labels "Portrait" and "Landscape" adjacent thereto respectively. The "Size of Original" item ECb can be set to any one of set values such as "A4", "A3", "B4" and the like. The "Size of Sheet" item ECc can be set to any one of set values such as "A4", "A3", "B4", "Same as Size of Original" and the like. The "Paper Feed Tray" item ECd can be set to any one of set values such as "automatic", "tray 1", "tray 2" and the like. The "Type of Paper" item ECe can be set to any one of set values such as "standard paper", "glossy paper" and the like. The "Output Mode" item ECf can be set to any one of set values such as "Normal Print", "Test Print" and the like. These setting items ECb to ECf can be set to desired set values by pull down controls. A user can display selectable set values (items) by pressing a list button LB, which is located at the right end of each of the setting items ECb to ECf, and select one of the displayed set values.

The "Sort (per copy)" item ECh and the "Sort" item ECi can be set to either set value of "On" and "Off" respectively. These setting items ECh and ECi can be set to desired set values by alternative selection. A user can switch On/Off by operating a selection control SO which is located at the right side of each of the setting items ECh and ECi.

Figure 6:
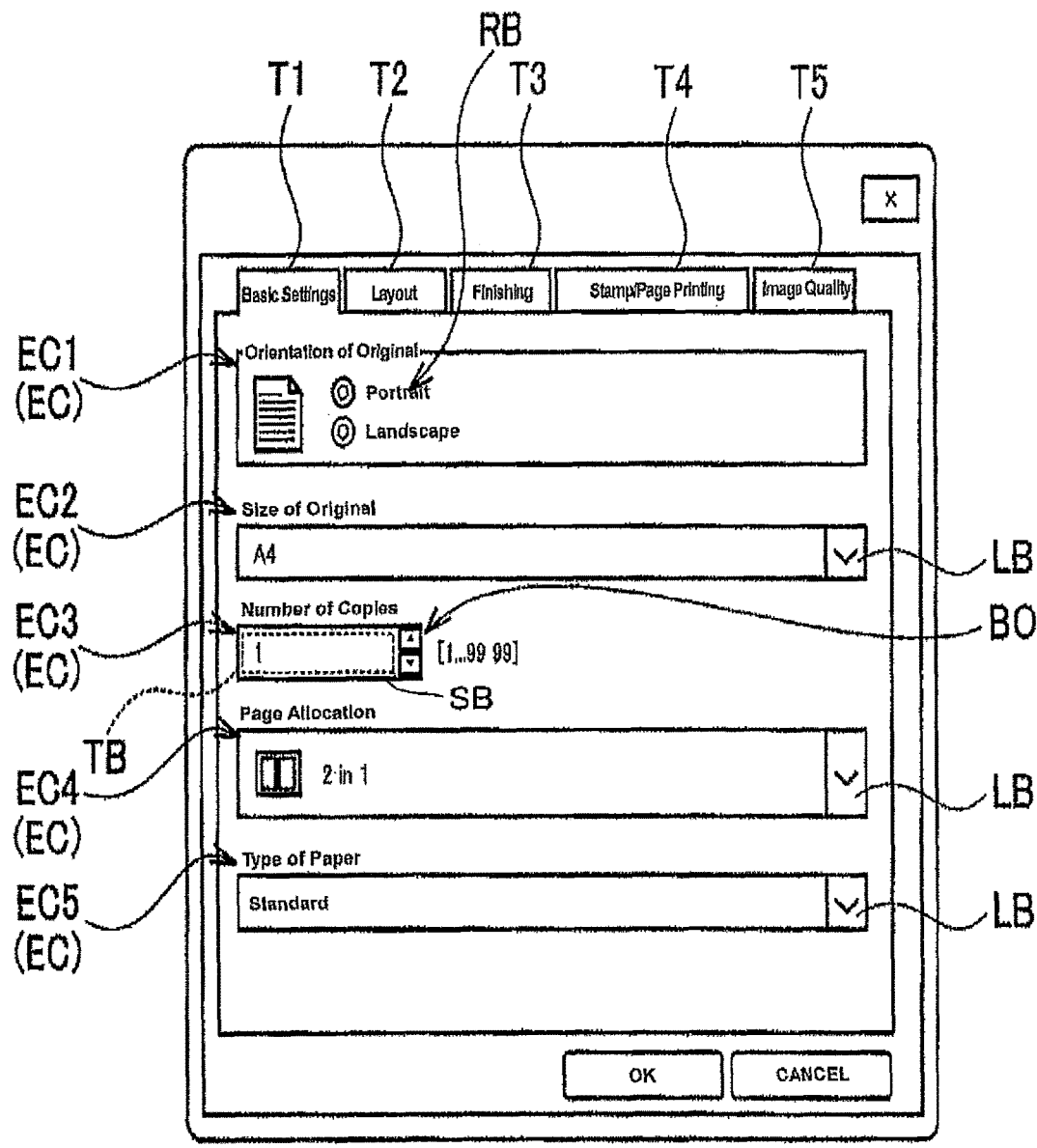
FIG. 6 is a schematic diagram for showing a print setting screen for desktop UI.

FIG. 6 is a schematic diagram for showing a print setting screen for desktop UI. As illustrated in FIG. 6, the print setting screen includes, for example, five tabs T1 to T5, i.e., a "basic setting" tab T1, a "layout" tab T2, a "finishing" tab T3, a "stamp/page printing" tab T4, and an "image quality" tab T5. The screen which is displayed when the "basic setting" tab T1 is designated includes a plurality of setting items EC, i.e., an "Orientation of Original" item EC1, a "Size of Original" item EC2, a "Number of Copies" item EC3, a "Page Allocation" item EC4 and a "Type of Paper" item EC5, which are displayed from the top of the screen in this order.

Arbitrary set values can be entered to the setting items EC1 to EC5 respectively. The "Orientation of Original" items EC1 can be set to either set value of "Portrait" and "Landscape". The set value can be set through radio buttons RB arranged with labels "Portrait" and "Landscape" adjacent thereto respectively. The "Size of Original" item EC2 can be set to any one of set values such as "A4", "A3", "B4" and the like. The "Number of Copies" item EC3 can be set to a set value between 1 to 9999. The "Page Allocation" item EC4 can be set to any one of set values such as "2in1", "4in1" and the like. The "Type of Paper" item EC5 can be set to any one of set values such as "standard paper", "glossy paper" and the like. Of these setting items, the "Size of Original" item EC2, the "Page Allocation" item EC4 and the "Type of Paper" item EC5 can be set to desired set values by pull down controls. A user can display selectable set values (items) by pressing a list button LB, which is located at the right end of each of the setting items EC2, EC4 and EC5, and select one of the displayed set values. The "Number of Copies" item EC3 can be set to a set value through a spin box SB consisting of a text box TB for inputting the number of copies and operation buttons BO for incrementing and decrementing the number of copies.

The UI processing unit 27b displays the above setting items EC by a display program with which each setting item EC is associated in advance. Namely, the setting items EC are displayed and arranged with input forms (radio buttons RB for alternative selection, pull down controls and so forth) in accordance with the display program.

Figure 8:
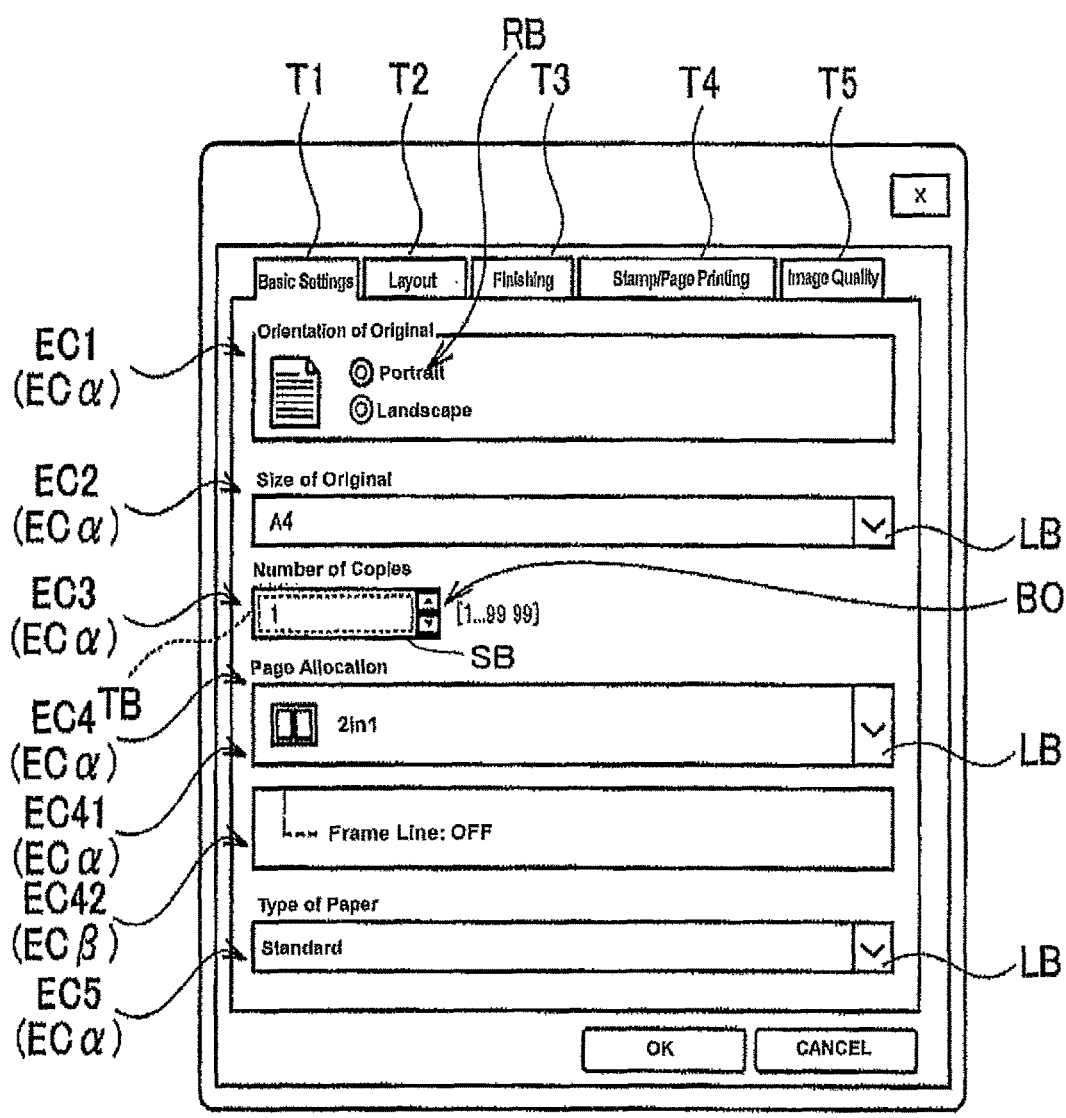
FIG. 8 is a schematic diagram for showing a print setting screen for desktop UI in which a second setting items ECβ is illustratively displayed.

However, in the case of the present embodiment, the driver core module 26 and the UI unit 27 can be installed and updated independently. In this case, there may occur inconsistence in version between the driver core module 26 and the UI unit 27. When such inconsistence occurs, the setting items EC transmitted from the driver core module 26 and received by the UI unit 27 may include setting items ECα (hereinafter referred to as first setting items) which are associated with the display program and the remaining setting items ECβ (hereinafter referred to as second setting items) other than the first setting items. FIG. 8 shows examples of the first setting items ECα and the second setting items ECβ.

The UI processing unit 27b of the present embodiment is provided with a default program which can display the second setting items ECβ which are not associated with the display program in order to prevent the second setting items ECβ from being not displayed.

Nevertheless, when the second setting items ECβ is displayed by the default program, the second setting items EC β may not be displayed in an appropriate position so that the usability is substantially degraded.

In order to solve this problem, the UI unit 27 runs the UI program in accordance with the present embodiment to performs the following process. First, the UI processing unit 27b performs the display program to display the first setting items ECα based on the information about the setting items EC input from the driver core module 26.

Furthermore, the setting item information processing unit 27a acquires group information from the driver core module 26. The group information is information which is assigned to each of the plurality of setting items EC and indicates the group to which this each setting item belongs.

FIG. 7 shows an example of the group information.

Incidentally, in the case of the example shown in FIG. 7, it is assumed that only the driver core module 26 is updated to add a "Frame Line" item EC42 (with respect to reference EC42, refer to FIG. 8 to be described below) as a second setting item ECβ. As illustrated in FIG. 7, for example, group information named "basic setting" is assigned to the "Orientation of Original" item EC1, the "Size of Sheet" item EC2, the "Number of Copies" item EC3, the "Page Allocation" item EC4 and the "Type of Paper" item EC5.

Since the "Frame Line" item EC42 is added as a second setting item ECβ, in the case of the example shown in FIG. 7, the "Page Allocation" item EC4 is separated in detail into an "Allocation Layout" item EC41 (with respect to reference EC41, refer to FIG. 8 to be described below) and the "Frame Line" item EC42. Group information named "Page Allocation" is assigned to the "Allocation Layout" item EC41 and the "Frame Line" item EC42.

Meanwhile, as illustrated in FIG. 7, the plurality of setting items EC further include an "Overlay" item, a "Watermark" item, a "Watermark Text" item, a "Font Name" item, a "Border" item, and a "Color" item and so forth to which group information is assigned respectively. Specifically, group information named "stamp/page printing" is assigned to the setting items EC of "Overlay" and "Watermark", and group information named "Watermark" is assigned to the setting items EC of "Watermark Text", "Font Name", "Border" and "Color" respectively.

Needless to say, even though omitted in FIG. 7, there are other setting items EC to which group information is assigned respectively.

Referring to FIG. 3 again, the UI processing unit 27b displays a second setting item ECβ in a position adjacent to a first setting item ECα belonging to the same group information as this second setting item ECβ. FIG. 8 shows an example of a print setting screen for desktop UI in which a second setting item ECβ is displayed.

As illustrated in FIG. 8, the UI processing unit 27b determines, based on group information, a position in which the "Frame Line" item EC42 is to be displayed as a second setting item. As illustrated in FIG. 7, the group information named "Page Allocation" is assigned to the "Frame Line" item EC42. Also, this group information named "Page Allocation" is assigned also to the "Allocation Layout" item EC41. As illustrated in FIG. 8, therefore, the UI processing unit 27b displays the "Frame Line" item EC42 which is a second setting item ECβ in a position adjacent to the "Allocation Layout" item EC41 which is a first setting item ECα belonging to the same group information as the second setting item ECβ.

By this configuration, even when only the driver core module 26 is updated such that a new setting item ECβ is introduced, this new setting item ECβ is displayed in an appropriate position adjacent to another setting item ECα which is highly relevant with the setting item ECβ and thereby the usability is substantially improved.

It is preferred here that the setting item information processing unit 27a acquires not only group information but also control information (radio buttons RB for alternative selection, pull down controls and so forth) indicative of input forms to be used for inputting printing conditions, and that the UI processing unit 27b displays a second setting item ECβ by the use of the input forms based on the acquired control information. The second setting item ECβ can thereby be displayed in the appropriate input forms. Incidentally, the control information is assigned to each setting item EC in the same manner as the group information.

The "Frame Line" item EC42 shown in FIG. 8 can be displayed with a pull down control. Namely, when a user operates a mouse which is one of the input device 24 to click the "Frame Line" item EC42, the UI processing unit 27b displays two alternatives of "frame line: off" and "frame line: on" in order that one alternative can be selected. The UI processing unit 27b displays the second setting item ECβ with reference to the control information in addition to the group information.

Furthermore, it is preferred here that the setting item information processing unit 27a also acquires the positional information indicative of the position adjacent to the first setting item ECα, and that the UI processing unit 27b displays the second setting item ECβ in the adjacent position based on the acquired positional information. This makes more appropriate the display position of the second setting item ECβ. Incidentally, the positional information is assigned to each setting item EC in the same manner as the group information.

In the case of the example shown in FIG. 8, the "Frame Line" item EC42 is displayed at a downward distance of a predetermined number of bits from the "Allocation Layout" item EC41. The "Frame Line" item EC42 is provided for determining whether to encircle, with frame lines, images of a plurality of pages to be allocated in a single sheet, such as 2in1, 4in1 or the like, which is a set value of the "Allocation Layout" item EC41. If the "Frame Line" item EC42 is located above the "Allocation Layout" item EC41, therefore, users may not understand the purpose of the frame line so that the display is hard to understand. That is to say, since the "Frame Line" item EC42 assumes the existence of the "Allocation Layout" item EC41, it is preferred that the "Frame Line" item EC42 is located just below the "Allocation Layout" item EC41. Accordingly, the setting item information processing unit 27*a* also acquires the positional information, and the UI processing unit 27*b* displays the second setting item ECβ based on the positional information.

Figure 9:
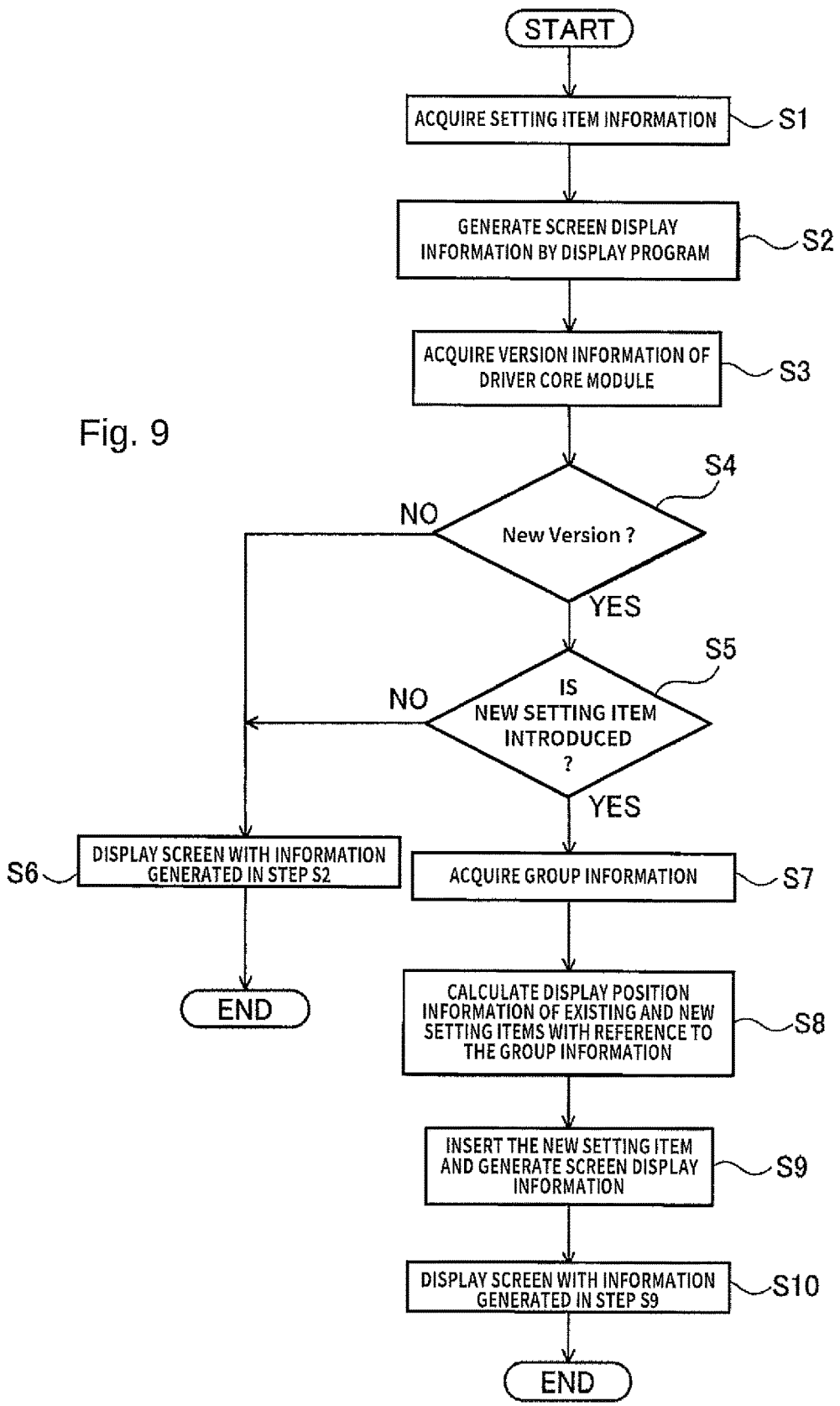
FIG. 9 is a flow chart for showing a method of controlling the PC in accordance with the present embodiment.

Next is an explanation of a method of controlling the PC 2 in accordance with the present embodiment. FIG. 9 is a flow chart for showing the control method of the PC 2 in accordance with the present embodiment. The PC 2 performs the process shown in FIG. 9 by running a program stored in the auxiliary storage device 23. Incidentally, the process shown in the flow chart of FIG. 9 is run when opening the print setting screen for modern UI or desktop UI.

As illustrated in FIG. 9, the setting item information processing unit 27*a* of the UI unit 27 acquires information about the setting item EC from the driver core module 26 (S1).

Next, the UI processing unit 27*b* generates screen display information of the setting item EC acquired in step S1 by the display program (S2: first display control step). The setting item information processing unit 27*a* of the UI unit 27 then acquires the version information of the driver core module 26 (S3).

The UI unit 27 then determines whether or not the driver core module 26 is updated to a new version by comparing the version acquired in step S3 with the version of the driver core module 26 stored in the UI unit 27 (S4).

If the driver core module 26 is updated to a new version (S4: YES), the UI unit 27 determines whether or not there is a new setting item ECβ, i.e., a second setting item ECβ (S5). This step S5 of determining whether or not there is a second setting item ECβ (S5) is performed, for example, by determining whether or not all the setting items EC acquired in step S1 are associated with the display program.

If the driver core module 26 is not updated to a new version (S4: NO) or if there is no new second setting item EC β (S5: NO), the UI processing unit 27*b* display a screen in accordance with the information which is generated in step S2 (S6: first display control step). The process shown in FIG. 9 is then finished.

On the other hand, if there is a new second setting item ECβ (S5: YES), the setting item information processing unit 27*a* acquires group information as shown in FIG. 7 from the driver core module 26 (S7: acquiring step). Furthermore, in step S7, the setting item information processing unit 27*a* also acquires control information and positional information from the driver core module 26.

Next, the UI processing unit 27*b* calculates display position information used for displaying the new setting item (second setting item) ECβ and the existing setting items (first setting items) ECα with reference to the group information acquired in step S7 (S8: second display control step). In this case, with respect to the new setting item ECβ, the display position information is generated to be adjacent to the existing setting item ECα belonging to the same group information as the new setting item ECβ. Furthermore, the UI processing unit 27*b* calculates detailed display position information based on the positional information acquired in step S7.

The UI processing unit 27*b* then generates screen display information anew by inserting the new setting item EC β into the screen display information generated in step S2 (S9: second display control step). In this case, based on the display position information calculated in step S8, the UI processing unit 27*b* generates the screen display information into which the new setting item ECβ is inserted. Furthermore, the generated screen display information includes the control information which is acquired in step S7, such that the new setting item ECβ is displayed with an input form designated by the control information. Incidentally, since the new setting item ECβ is added and inserted into the screen display information generated in step S2, the sizes of the existing setting items ECα are decreased and rearranged at decreased distances therebetween in the screen display information generated in step S9.

The UI processing unit 27*b* then performs screen display with the information generated in step S9 (S10: second display control step). The process shown in FIG. 9 is then finished.

As has been discussed above, the UI program, the PC 2 and the control method thereof in accordance with the present embodiment make it possible to display a second setting item ECβ in a position adjacent to a first setting item ECα belonging to the same group information as this second setting item ECβ. Because of this, even if there is a setting item EC which is not supported by the existing display program, this setting item EC can be displayed in the vicinity of another relevant setting item EC which is supported by the existing display program. By this configuration, even when only the driver core module 26 is updated to introduce a new setting item ECβ while the UI unit 27 is not updated, it is avoided to fail to find where the new setting item ECβ is to be displayed, but the new setting item ECβ can be displayed in the vicinity of another relevant setting item EC. Accordingly, it is possible to display the new setting item ECβ in a position where the usability is substantially improved.

The UI processing unit 27*b* displays a second setting item ECβ by the use of the input forms based on the control information which is acquired for inputting printing conditions and assigned to the second setting item ECβ of the plurality of setting items EC. The second setting item ECβ can be displayed in the form of an input control, e. g. radio buttons RB for alternative selection, pull down controls and so forth which is designated by the control information. By this configuration, the new setting item EC can be displayed in a more appropriate input form. Accordingly, it is possible to improve the usability.

Also, of the plurality of setting items EC, the second setting item ECβ is given positional information indicative of a position adjacent to the first setting item ECα, and the second setting item ECβ is displayed in the adjacent position based on the positional information by acquiring the positional information. Because of this, the second setting item ECβ can be displayed in an appropriate position such as a predetermined position just below a relevant first setting item ECα. Accordingly, it is possible to further improve the usability.

The UI program, the print control apparatus and the method of controlling the same have been explained based on the embodiments in accordance with the present invention. However, it is not intended to limit the present invention to the precise form described, and obviously many modifications and variations are possible without departing from the scope of the invention as well as any combination of these embodiments.

For example, in accordance with the above embodiment, the UI unit 27 receives all of the group information, the control information and the positional information from the driver core module 26. However, the UI unit 27 may receive only the group information, or the group information and only either the control information or the positional information but not both. Furthermore, in addition to or in place of the control information and/or the positional information, any other information from the driver core module 26 may be received by the UI unit 27 for displaying the second setting item ECβ in a more appropriate position to further improve usability. Incidentally, the default program may be provided, for example, with a routine to display a second setting item ECβ with a pull down control when the UI unit 27 does not provide control information. Furthermore, the default program may be provided, for example, with a routine to display a second setting item ECβ at a downward distance of a predetermined number of bits from a relevant first setting item ECα when the UI unit 27 does not provide control information.

The process shown in FIG. 9 is invoked when opening either the print setting screen for modern UI or desktop UI. However, the process shown in FIG. 9 may be invoked only when opening a particular one of the print setting screens and not invoked when opening the other print setting screen.

Furthermore, the "Frame Line" item EC42 of the present embodiment (i.e., the second setting item ECβ) is displayed with a pull down control through which a set value can be input. However, the "Frame Line" item EC42 (i.e., the second setting item ECβ) may be displayed with a text box TB through which a set value can be directly input. In addition to this, the "Frame Line" item EC42 (i.e., the second setting item EC β) may be displayed with any other input control such as radio buttons RB.

Still further, the "Allocation Layout" item EC41 is a first setting item ECα having the same group information as the "Frame Line" item EC42 which is a second setting item ECβ of the present embodiment. Because of this, the "Frame Line" item EC42 is displayed adjacent the "Allocation Layout" item EC41. However, in the case where there are two or more first setting items ECα having the same group information as the "Frame Line" item EC42, it is preferred to determine either one of the two first setting items ECα in advance, for example, the first setting item ECα which is displayed in the uppermost position.

What is claimed is:

1. A non-transitory computer readable medium on which is recorded a UI program for operating a computer as a print control apparatus in cooperation with a driver core module and a UI module, wherein the UI module receives information about a plurality of setting items for setting printing conditions from the driver core module and displays a user interface of the plurality of setting items to a user, and wherein the driver core module is configured to perform a drawing process based on set values input to the plurality of setting items and output a print job including the result of the drawing process to a printing apparatus, the UI program causing the computer to execute:

a first display control step of running a display program and displaying, of the plurality of setting items received from the driver core module, first setting items which can be displayed by the display program;

an acquiring step of acquiring group information which is assigned to each of the plurality of setting items and indicative of a group and subgroup to which the each setting item belongs, wherein each subgroup relates to a function of the setting item or items assigned to that subgroup;

a step of determining whether or not the driver core module has been updated to introduce a new setting; and a second display control step of running, when it has been determined that the driver core module has been updated to introduce a new setting and the UI module has not been updated, a default program and displaying, with the plurality of setting items received from the driver core module, a second setting item which is the new setting item;

a second determining step of determining, in accordance with the group information acquired in the acquiring step, to which subgroup the second setting item belongs;

wherein in the second display control step, the second setting item is displayed in the determined subgroup adjacent to the first setting items assigned to the determined subgroup.

2. The non-transitory computer readable medium of claim 1 wherein in the acquiring step, control information is acquired which is assigned to the second setting item of the plurality of setting items and indicative of an input form for inputting a printing condition to the second setting item, and wherein in the second display control step, the second setting item is displayed in the input form in accordance with the control information acquired in the acquiring step.

3. The non-transitory computer readable medium of claim 1 wherein in the acquiring step, positional information is acquired which is assigned to the second setting item of the plurality of setting items and indicative of the position adjacent to one of the first setting items, and wherein in the second display control step, the second setting item is displayed in the adjacent position in accordance with the positional information acquired in the acquiring step.

4. The non-transitory computer readable medium of claim 1 wherein in the second display control step, the second setting item is displayed in a position adjacent to one of the first setting items having the same group information as the second setting item.

5. A print control apparatus having a driver core module and a UI module, wherein the UI module receives information about a plurality of setting items for setting printing conditions from the driver core module and displays a user interface of the plurality of setting items to a user, and wherein the driver core module is configured to perform a drawing process based on set values input to the plurality of setting items and output a print job including the result of the drawing process to a printing apparatus, the print control apparatus comprising:

a hardware processor configured to:

run a display program and display, of the plurality of setting items received from the driver core module, first setting items which can be displayed by the display program;

acquire group information which is assigned to each of the plurality of setting items and indicative of a group and subgroup to which the each setting item belongs, wherein each subgroup relates to a function of the setting item or items assigned to that subgroup;

determine whether or not the driver core module has been updated to introduce a new setting; and run, when it has been determined that the driver core module has been updated to introduce a new setting and the UI module has not been updated, a default program having been stored in advance and display, with the plurality of setting items received from the driver core module, a second setting item which is the new setting item;

determine, in accordance with the acquired group information, to which subgroup the second setting item belongs;

wherein the second setting item is displayed in the determined subgroup adjacent to the first setting items assigned to the determined subgroup.

6. The print control apparatus of claim 5 wherein
the second setting item is displayed in a position adjacent to one of the first setting items having the same group information as the second setting item.

7. A control method of controlling a print control apparatus implemented with a driver core module and a UI module, wherein the UI module receives information about a plurality of setting items for setting printing conditions from the driver core module and displays a user interface of the plurality of setting items to a user, and wherein the driver core module is configured to perform a drawing process based on set values input to the plurality of setting items and output a print job including the result of the drawing process to a printing apparatus, the control method comprising:

a first display control step of running a display program and displaying, of the plurality of setting items received from the driver core module, first setting items which can be displayed by the display program;

an acquiring step of acquiring group information which is assigned to each of the plurality of setting items and indicative of a group and subgroup to which the each setting item belongs, wherein each subgroup relates to a function of the setting item or items assigned to that subgroup;

a step of determining whether or not the driver core module has been updated to introduce a new setting; and a second display control step of running, when it has been determined that the driver core module has been updated to introduce a new setting and the UI module has not been updated, a default program and displaying, with the plurality of setting items received from the driver core module, a second setting item which is the new setting item, a second determining step of determining, in accordance with the group information acquired in the acquiring step, to which subgroup the second setting item belongs;

wherein in the second display control step, the second setting item is displayed in the determined subgroup adjacent to the first setting items assigned to the determined subgroup.

8. The control method of claim 7 wherein
in the second display control step, the second setting item is displayed in a position adjacent to one of the first setting items having the same group information as the second setting item.

* * * * *